(12) United States Patent
Guthrie et al.

(10) Patent No.: US 11,409,312 B1
(45) Date of Patent: Aug. 9, 2022

(54) NON-LINEAR LOAD LINE FOR A MULTIPHASE VOLTAGE REGULATOR

(71) Applicant: Renesas Electronics America Inc., Milpitas, CA (US)

(72) Inventors: Travis Guthrie, Austin, TX (US); Jim Toker, Austin, TX (US); Shea Petricek, Dallas, TX (US)

(73) Assignee: RENESAS ELECTRONICS AMERICA INC., Milpitas, CA (US)

( * ) Notice: Subject to any disclaimer, the term of this patent is extended or adjusted under 35 U.S.C. 154(b) by 288 days.

(21) Appl. No.: 16/856,758

(22) Filed: Apr. 23, 2020

Related U.S. Application Data

(60) Provisional application No. 62/838,103, filed on Apr. 24, 2019.

(51) Int. Cl.
*G05F 1/56* (2006.01)
*G06F 1/26* (2006.01)

(52) U.S. Cl.
CPC . *G05F 1/56* (2013.01); *G06F 1/26* (2013.01)

(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735
See application file for complete search history.

(56) References Cited

U.S. PATENT DOCUMENTS

| | | | | |
|---|---|---|---|---|
| 7,034,511 B2* | 4/2006 | Schuellein | .......... | H02M 3/1588 323/272 |
| 7,489,117 B2* | 2/2009 | Jain | ....... | H02M 3/158 323/224 |
| 9,130,448 B2* | 9/2015 | Hu | .......... | H02M 7/02 |
| 9,385,609 B2* | 7/2016 | Babazadeh | ......... | H02M 3/1584 |
| 9,841,776 B1* | 12/2017 | Bari | ........ | G05F 1/56 |
| 10,019,021 B1* | 7/2018 | Lee | ....... | H02M 3/158 |
| 10,574,253 B1* | 2/2020 | Guthrie | ............ | G01R 19/2509 |
| 10,948,934 B1* | 3/2021 | Young | .......... | H02M 3/156 |
| 2002/0180410 A1* | 12/2002 | Brooks | .......... | H02M 3/1584 323/282 |
| 2005/0077883 A1* | 4/2005 | Walters | ............ | H02M 3/156 323/273 |
| 2006/0061340 A1* | 3/2006 | Wang | ............ | H02M 3/156 323/267 |
| 2007/0013350 A1* | 1/2007 | Tang | .......... | H02M 3/1584 323/237 |
| 2008/0122412 A1* | 5/2008 | Burton | .......... | G05F 1/56 323/234 |

(Continued)

*Primary Examiner* — Thienvu V Tran
*Assistant Examiner* — Nusrat Quddus
(74) *Attorney, Agent, or Firm* — Foley & Lardner LLP

(57) ABSTRACT

One or more embodiments relate to a multi-phase voltage regulator with AVP or droop configured to implement a non-linear load line. According to certain aspects, the non-linear load line can have a non-linear or zero slope in a first current/voltage region and a constant non-zero slope in second current/voltage region. In embodiments, the non-linear or zero slope region can specify that for any value of output current in that region, the output voltage will be the same predetermined value. The non-zero slope region can specify that for any value of the output current in that region, output current will be multiplied by a constant non-zero droop resistance value.

12 Claims, 6 Drawing Sheets

(56) References Cited

U.S. PATENT DOCUMENTS

| | | | | |
|---|---|---|---|---|
| 2009/0121695 | A1* | 5/2009 | Pierson | H02M 3/1584 323/283 |
| 2009/0190379 | A1* | 7/2009 | Melanson | H02M 3/156 363/21.13 |
| 2009/0322300 | A1* | 12/2009 | Melanson | H02M 3/1563 323/284 |
| 2010/0013305 | A1* | 1/2010 | Heineman | H02J 1/001 307/31 |
| 2012/0200274 | A1* | 8/2012 | Tang | H02M 3/1584 323/271 |
| 2013/0119951 | A1* | 5/2013 | Sreenivas | H02M 3/157 323/234 |
| 2014/0032942 | A1* | 1/2014 | Takehara | G06F 1/26 713/300 |
| 2014/0333270 | A1* | 11/2014 | Young | G05F 1/12 323/234 |
| 2015/0115910 | A1* | 4/2015 | Jiang | H02M 3/1584 323/271 |
| 2015/0222182 | A1* | 8/2015 | Searles | H02M 3/1588 327/541 |
| 2015/0270770 | A1* | 9/2015 | Schroeder | H02M 3/156 307/31 |
| 2015/0349634 | A1* | 12/2015 | Tschirhart | H02M 3/158 702/64 |
| 2016/0301303 | A1* | 10/2016 | Bari | H02M 3/156 |
| 2017/0237345 | A1* | 8/2017 | Manlove | H02M 3/156 323/274 |
| 2018/0013348 | A1* | 1/2018 | Paul | H02M 3/157 |
| 2020/0343731 | A1* | 10/2020 | Hassan | G05B 19/042 |
| 2020/0358354 | A1* | 11/2020 | You | H02M 3/156 |
| 2021/0034084 | A1* | 2/2021 | Zou | H03F 3/45475 |
| 2022/0069703 | A1* | 3/2022 | Krishnamurthy | H02M 3/157 |

\* cited by examiner

NON-LINEAR LOAD LINE FOR A MULTIPHASE VOLTAGE REGULATOR

CROSS-REFERENCE TO RELATED PATENT APPLICATIONS

The present application claims priority from U.S. Provisional Patent Application No. 62/838,103, filed Apr. 24, 2019, the contents of which are incorporated herein by reference in their entirety.

TECHNICAL FIELD

The present embodiments relate generally to power management and power electronics, and more particularly power supply performance during varying load conditions.

BACKGROUND

Power supply performance, especially transient response, is considered important to meeting certain demands for low voltage, high current power. In an effort to improve the transient response i.e., to minimize the voltage deviation during a load step, a technique named "active voltage positioning" (AVP) is generating substantial interest and gaining popularity especially in the portable computer market. The benefits include lower peak-to-peak output voltage deviation for a given load step, without having to increase the output filter capacitance. Alternatively, the output filter capacitance can be reduced while maintaining the same peak-to-peak transient response. However, while AVP provides many advantages, further improvements remain desired.

SUMMARY

One or more embodiments relate to a multi-phase voltage regulator with AVP or droop configured to implement a non-linear load line. According to certain aspects, the non-linear load line can have a non-linear or zero slope in a first current/voltage region and a constant non-zero slope in second current/voltage region. In embodiments, the non-linear or zero slope region can specify that for any value of output current in that region, the output voltage will be the same predetermined value. The non-zero slope region can specify that for any value of the output current in that region, output current will be multiplied by a constant non-zero droop resistance value.

According to further aspects, a multi-phase voltage regulator according to embodiments includes a load line modifier circuit that is configured to sense an output current and to implement a non-linear load line for sensed output currents lower than or equal to a predefined low current level and higher than a predefined high current level, to ensure that the output voltage stays within a desired range of voltages.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
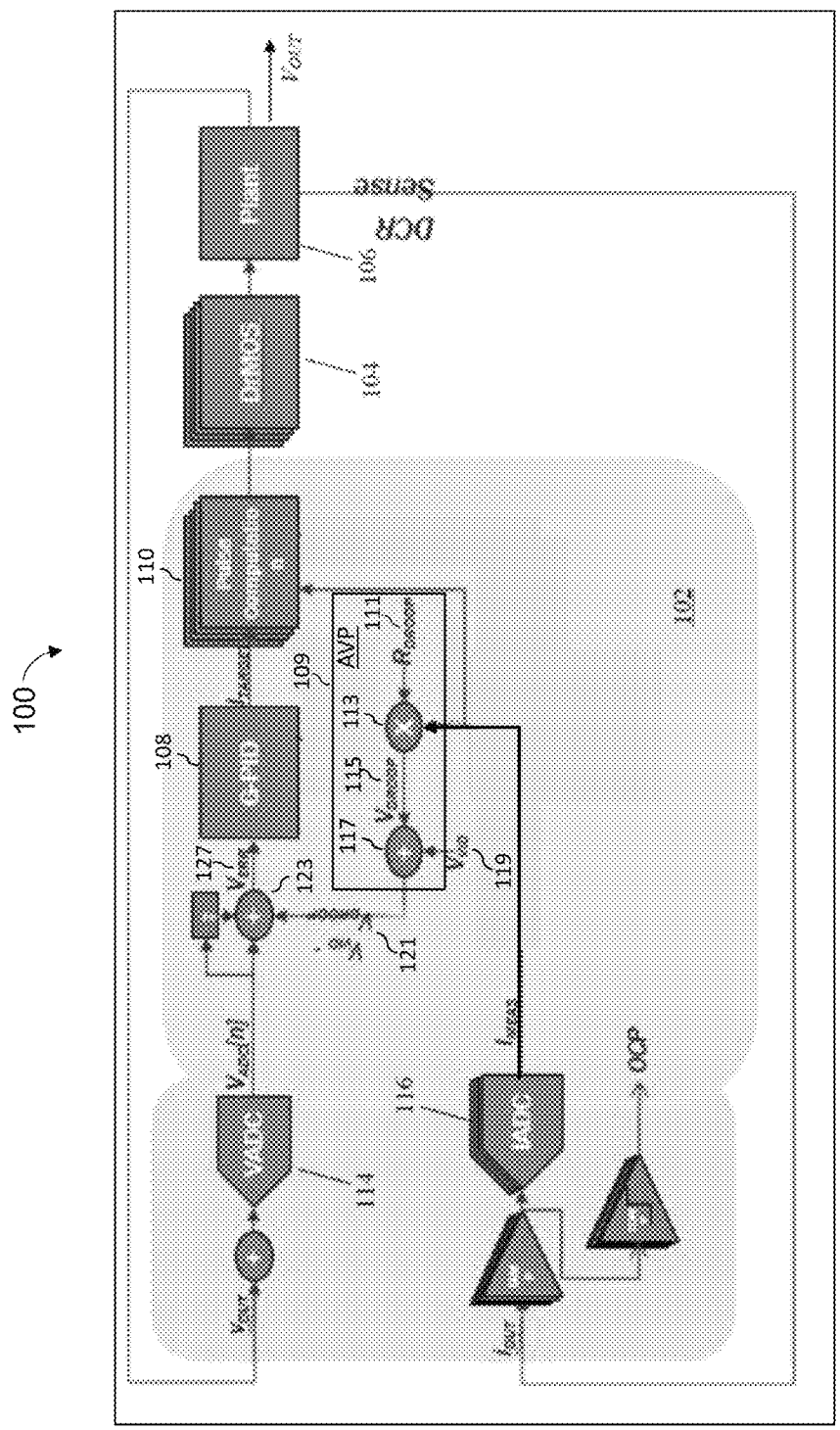
FIG. 1 is a block diagram of an example multiphase controller in which aspects of the embodiments may be used.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

As set forth above, active voltage positioning (AVP) is used in many power management systems in order to reduce the maximum voltage deviation from the programmed output voltage. Those skilled in the art may understand that AVP refers to setting the power supply output voltage at a point that is dependent on the load current (output current). In a typical implementation, the output voltage is set with respect to the load in an inversely proportional linear manner using a droop resistor which is typically coupled in series with the load. In other words, as the output current increases, the output voltage decreases and as the output current decreases, the output voltage increases. Moreover, in AVP, at minimum load, the output voltage is typically set to a slightly higher value or an offset than the nominal voltage; and at full load, the output voltage is typically set to a slightly lower value or an offset than the nominal voltage. This results in a better load transient response and a reduced maximum voltage deviation. If one were to consider an ideal load line for such a power supply, then it would be a line with a constant non-zero slope as decided by the droop resistor or droop value which results in the output voltage being inversely proportional to the output current.

A block diagram illustrating aspects of an example multiphase controller with an AVP implementation is shown in FIG. 1. The multiphase controller 100 may also be referred to as a multiphase voltage regulator. As shown, controller 100 includes a control stage 102 and an output stage 104. Plant 106 can comprise an output filter such as an inductor and capacitor and provide an output voltage $V_{OUT}$ to a load (not shown). Control stage 102 generally includes a G-PID block 108 and a pulse computation block 110, and can be implemented in many ways known to those skilled in the art. In operation, these blocks use voltage and current (e.g. DCR sense) feedbacks from plant 106 to produce PWM signals that are output by block 110 to output stage 104 (e.g. output drivers and power MOSFETs) so as to provide a regulated voltage $V_{OUT}$ to a load coupled to plant 106. In the illustrated example of FIG. 1, output stage 104 includes four phases. However, the present embodiments are not limited to this example number of phases, and can include two, three, or any number of phases.

As further shown, multiphase controller 100 includes a voltage sense ADC 114 and current sense ADCs 116. Voltage sense ADC 114 is a high bandwidth ADC whose output is used to regulate the output voltage. Current sense ADCs 116 (one for each phase, or four in this example) are provided to convert high bandwidth current sense information for use by blocks 108 and 110. In this example, a single summed current value ($I_{MEAS}$) from current sense ADCs 116 is output for further processing by AVP circuit 109. Voltage regulator 100 can further include a telemetry ADC (not shown) that is used to sample many other analog signals in the system with a high level of accuracy.

Controller 100 is also shown include an AVP circuit 109 comprising a droop resistance of value Rdroop 111, a multiplier 113, and a first adder/subtractor 117. Also included in the regulator are a second adder/subtractor 123 for generating an error signal ($V_{ERR}$) for processing by blocks 108 and 110. The multiplier 113 is configured to multiply the value of the droop resistance Rdroop 111 with the summed current sensed by the ADCs 116 to generate a droop voltage Vdroop 115 from which voltage Vvid 119 is subtracted by adder/subtractor 117 to generate a voltage Vvid−Vdroop 121 that is provided to adder/subtractor 123.

It should be noted that this is not necessary in all embodiments, but in the illustrated example, Vvid 119 is the target or reference voltage without AVP. The output of the voltage ADCs is also provided to adder/subtractor block 123, and these two inputs are used to generate an error voltage 127 for use by blocks 108 and 110. As can be appreciated by those skilled in the art the G-PIDs are configured to control the generation of PWM signals by the pulse computation block 110. As explained earlier, the droop voltage Vdroop 115 and the sensed current from ADCs 116 can be used to implement a load line for the controller 100.

Figure 2:
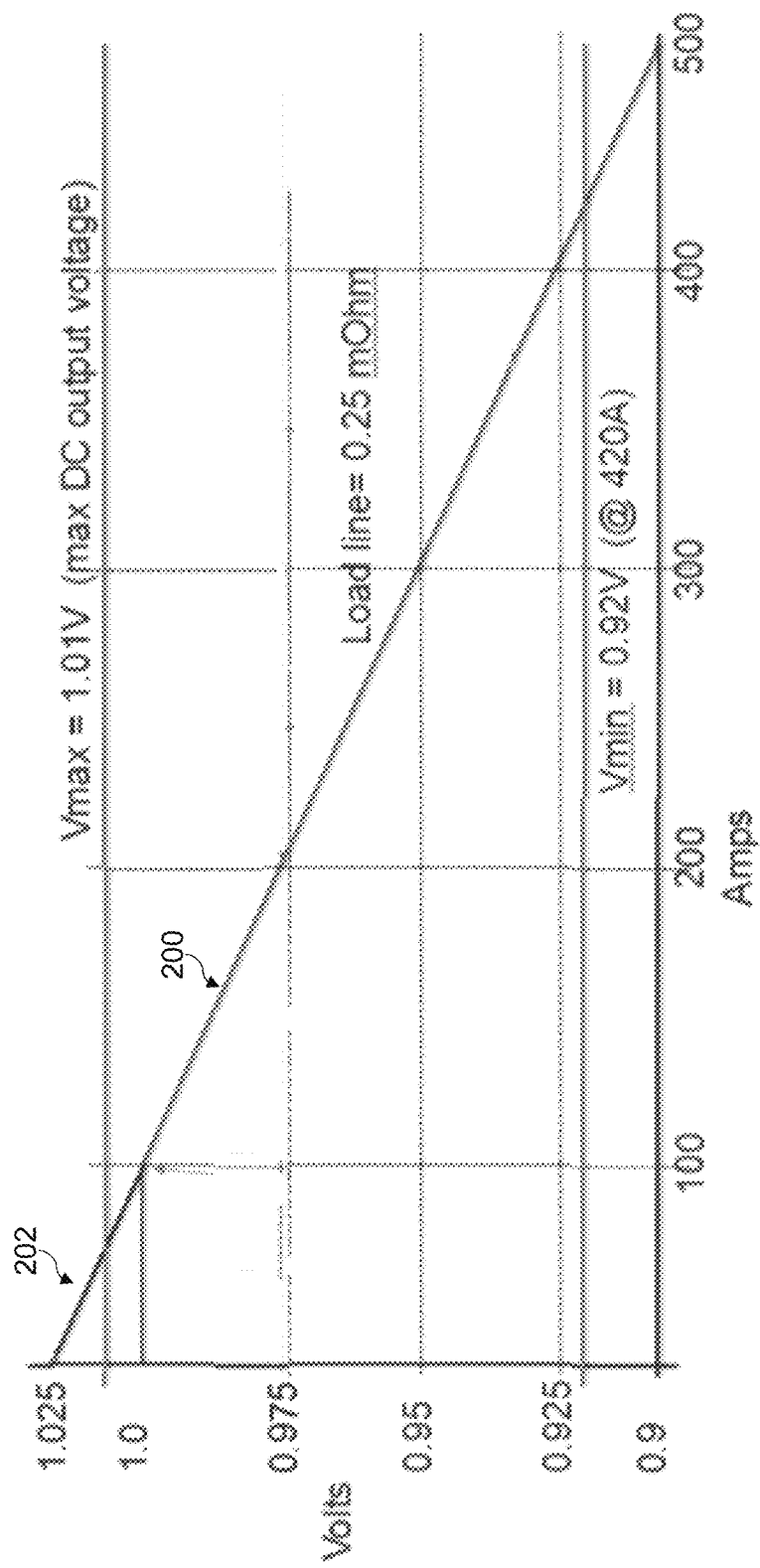
FIG. 2 is diagram illustrating an example load line of the multiphase controller of FIG. 1.

FIG. 2 is diagram illustrating an example load line 200 of the controller 100 of FIG. 1. The load line 200 shows output current on the x axis and output voltage on the y axis. The controller 100 in this example may be assumed to have a maximum DC output voltage Vmax=1.01V and a minimum output voltage Vmin=0.92V. In other words, in an acceptable DC regulation for this example, the output voltage should be in the range of 0.92V to 1.01V. The load line 200 is linear with a constant slope and represents values of the droop voltage Vdroop 115 for various values of sensed current from ADCs 116 (i.e. load current). The constant slope in this example may be realized by using a 0.25 mOhms droop resistor as Rdroop 111, using many ways known to those skilled in the art.

The present Applicant recognizes various shortcomings in conventional approaches implementing a load line such as the example load line 200 in FIG. 2. For example, as can be seen, in the region marked 202, the output voltage exceeds the maximum desired voltage Vmax. In other words, the output voltage can deviate too much during voltage regulation in such conventional approaches. Especially for systems with a very wide range of output currents, the ideal load line can implement a maximum voltage deviation that is not acceptable for today's processes.

Accordingly, among other things, the present Applicant has discovered that partially or fully modifying the load line for power systems with AVP or droop can help reduce the maximum output voltage deviation and unnecessary power loss. In particular, it has been discovered that making the slope of the load line non-linear for specified extreme values of output current can help reduce the maximum deviation. Those skilled may appreciate that modifying the slope of the ideal load line involves modifying a programmed output voltage for some values of output current than otherwise would be specified by a linear load line. These and other aspects will be now discussed in more detail below.

Figure 3:
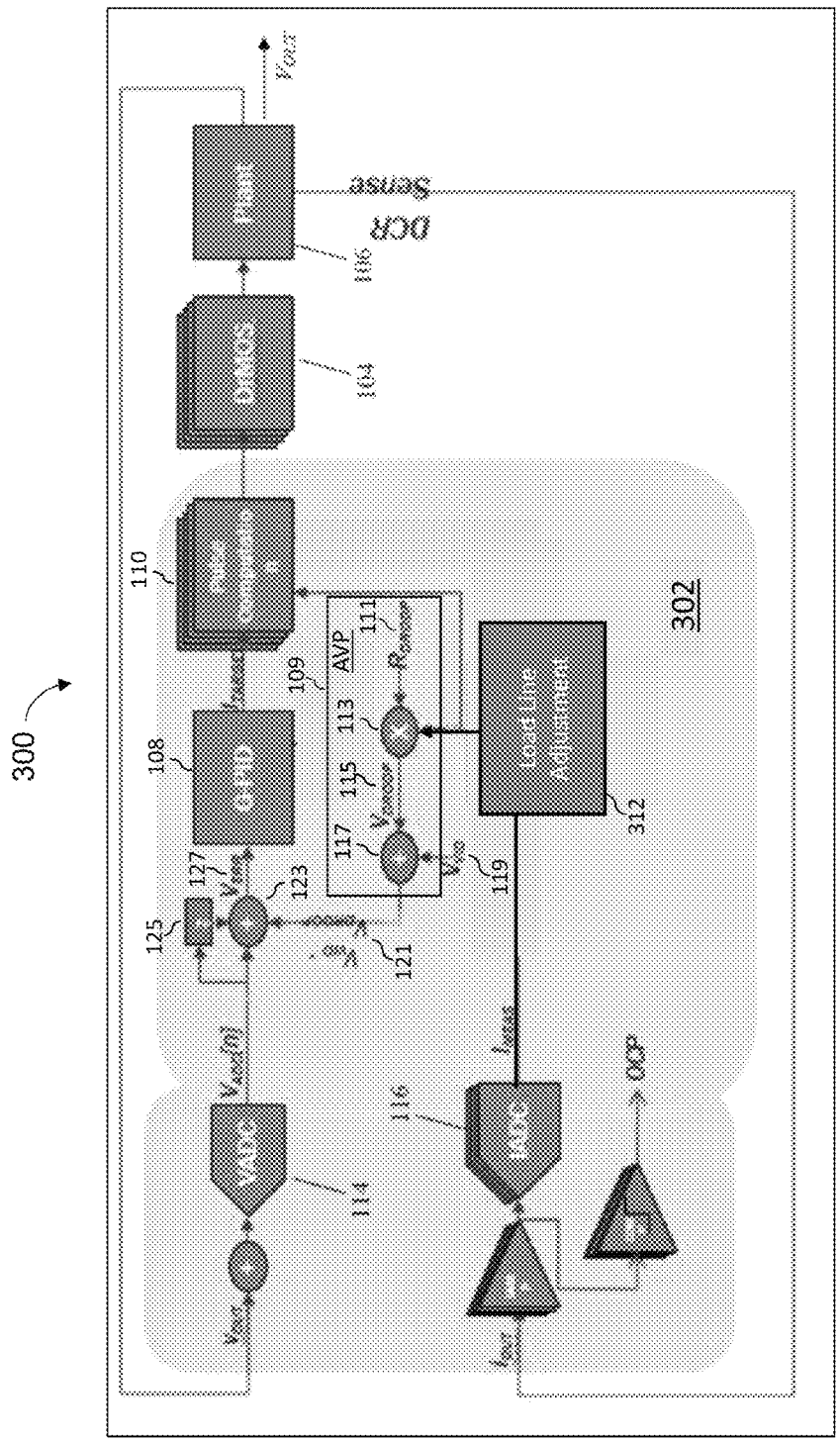
FIG. 3 is an example implementation of an example multiphase controller including a load line modifier circuit according to embodiments.

FIG. 3 is an example implementation of a load line modifier circuit within multiphase controller 300, according to an embodiment of the present disclosure. The controller 300 as shown in FIG. 3 includes a load line modifier circuit 312 coupled between the ADCs 116 and AVP circuit 109 as described above. As will explained in more details below, the load line modifier circuit causes controller 300 to implement a non-linear load line including a first portion having a zero slope and a second portion having a constant non-zero slope. For example, the load line modifier circuit 312 allows for the load line to change from a slope of zero in the first portion to its ideal non-zero slope in the second portion as specified by the droop resistor. In one example described in more detail below, the instant circuit 312 can implement a load line with slope of zero when the output current is lower than a predetermined or preset value (iSET) and implement a load line with slope equal to the ideal slope when the output current is higher than the preset value. The circuit 312 can modify the load line of the controller 300 in response to the sensed output current from the IADCs 116. As will be further explained below, the sensed output current over a certain preset level is directed into a DC path of circuit 312 and the remainder of the sensed current is directed into an AC path of circuit 312.

Figure 4:
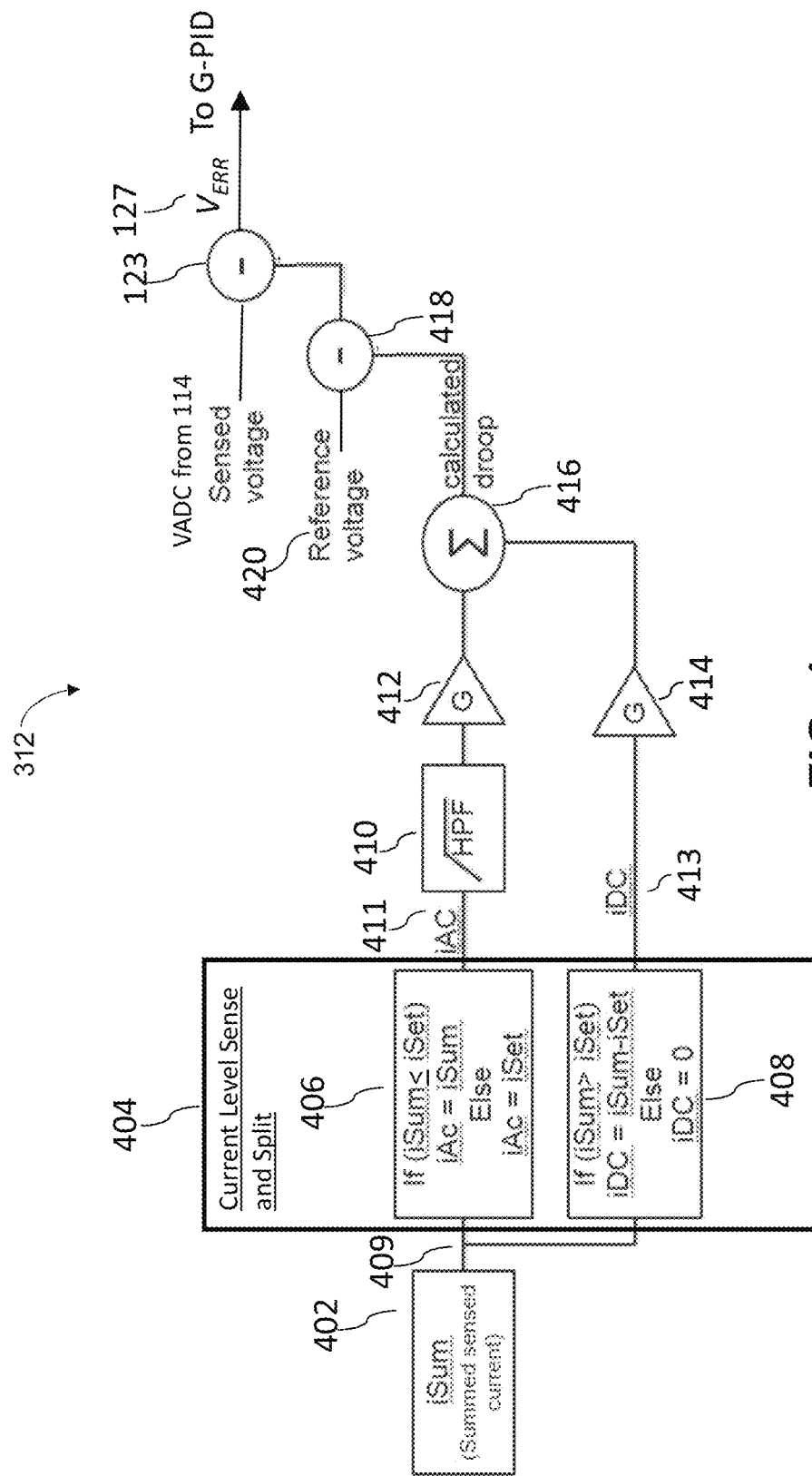
FIG. 4 is a diagram illustrating an example load line modifier circuit, according to an embodiment of the present disclosure.

FIG. 4 is a diagram illustrating details of an example load line modifier circuit 312 and how it can be implemented in controller 300, according to an embodiment of the present disclosure. As shown in this example, the load line modifier circuit 312 includes a current input block 402, a current level sense and split circuit 404, a high pass filter 410, a first gain 412, a second gain 414, a summer 416, and a subtractor 418. The circuit 412 can be used in a multi-phase system where each phase is delivering a respective output current.

In such a multiphase example, current input block 402 is coupled to receive the summed output currents (or alternatively to sum the individual output currents) from all phases sensed by the IADCs 116 and provides the summed sensed current iSUM 409 to the current level sense and split circuit 404. The current level sense and split circuit 404 is configured to compare the received iSUM against a preset level iSET. If iSUM is greater than iSET, any portion of iSUM above iSET is directed into a dc path of the regulator as iDC 413, which the portion iSET is directed into an ac path of the regulator as iAC 411. Otherwise, if iSUM is less than iSET, iSUM is directed only into the ac path of the regulator as iAC 411. More specifically, block 408 or circuit 404 is coupled to check if the current iSUM is greater than iSET. If so, then iSET is subtracted from the current value of iSUM and the resultant value is equated to iDC 413 which is be a positive non-zero value; if not then iDC 413 is made equal to zero. Similarly, block 406 of circuit 404 is coupled to check if the current iSUM is lower than or equal to iSET. If so, then the iAC 411 is made equal to the current value iSUM; if not then iAC 411 is made equal to iSET. The iAC 411 is then passed through the high pass filter 410 and gain 412 and further provided to the summer 416. The signal iDC 413 is passed through gain 414 and then provided to the summer 416. The gains 412 and 414 are configured to amplify the signals iDC 413 and the high-pass filtered version of iAC 411.

Referring briefly back to FIG. 3, although the resistor Rdroop 111 is shown as a physical resistor in FIG. 3, in some embodiments according to this disclosure, the resistor Rdroop 111 may be a digital value that represents the resistance of the load line and may be referred to as a digital resistance. The value of the digital resistance may be equal to G 412 and G 414. Furthermore, in a typical implementation G 412=G 414 so the resistance seen by the by the loop at high frequencies is the same across various load currents.

In typical configurations as shown in FIG. 1 and FIG. 3, the values of G 412 and G 414 may be made equal to the Rdroop 111 to ensure that the calculated droop at any frequency above the HPF 410 is constant.

The configuration of the blocks 406 and 408 is such that, under typical conditions where iSUM is greater than iSET, the portion of current above iSET is fed along the DC path iDC, and the remaining portion iSET is fed along the AC path iAC, with the combined current iSUM being subject to the linear load line for generating the output voltage. Meanwhile, under very low current conditions where iSUM is any value less than iSET, no current is fed along the DC path iDC and the fixed current value iSET is fed along the AC path iAC and high-pass filtered via block 410. In either event, the combined outputs from gains 412 and 414 are summed by block 416 and output as the current droop value for providing to block 418. Setting gains 412 and 414 both equal to Rdroop 111 ensures that a consistent effective resistance is applied to the loop across current loads or load currents.

Returning to the example of FIG. 4, the droop value from 416 is subtracted from a reference voltage 420 using the subtractor 418. As also shown in FIG. 1, the output of the subtractor 418 is further subtracted from the sensed voltage VADC 114 using the adder/subtractor 123 to generate or modify the error voltage $V_{ERR}$ 127 for use by the G-PID block 108.

It may be appreciated by those skilled in the art that in a broader sense, the circuit 312 is configured to apply a constant droop value to the output voltage whenever iSUM is any value lower than or equal to iSET; and apply a linearly variable droop value to the output voltage when iSUM is greater than iSET. Any value of iSUM less than iSET is passed through a programmable high pass filter and multiplied by a programmable AC current feedback term which is generally set to be equal to the value of Rdroop 111 and which ensures that the loop stability is maintained across all conditions. Those skilled in the art may appreciate that multiplying Rdroop times the subtraction of iSET from iSUM saturated at 0A will result in the desired load line response which is shown later in FIG. 5. The blocks 406 and 408 can be implemented using many ways known to those skilled in the art such as combinational and sequential circuits. The load modifier circuit may be implemented as part of controller 300 in any suitable fashion that can allow it to use the existing droop or AVP circuit 109. The value of iSET can be programmed according design preferences.

Figure 5:
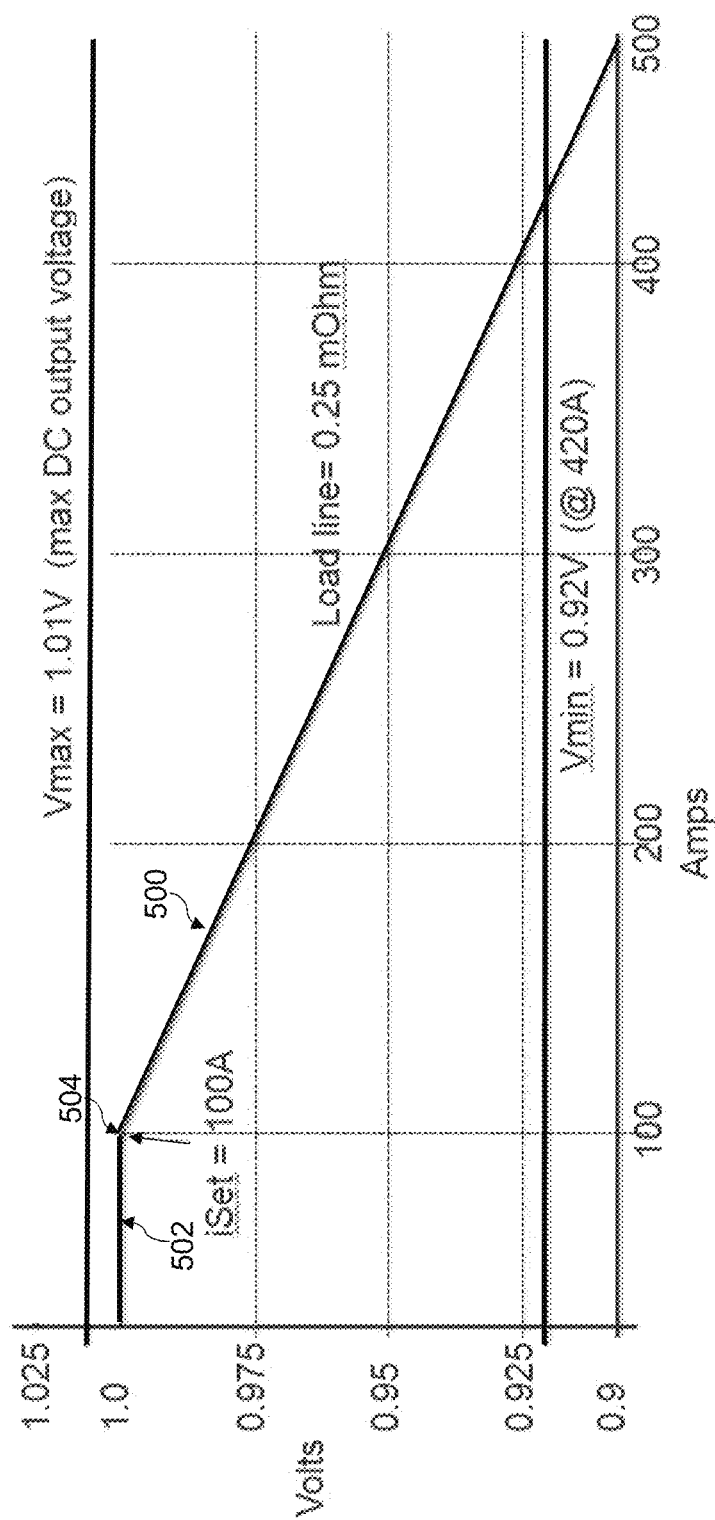
FIG. 5 is a diagram illustrating example aspects of a load line implemented by a multiphase controller according to an embodiment of the present disclosure.

FIG. 5 is a diagram illustrating an example load line 500 implemented by controller 300 of FIG. 3 including of the load line modifier circuit 312, according to an embodiment of the present disclosure. As can be seen, the load line 500 is non-linear with variable slope. In the portion indicated by 502, the slope of the load line is zero. At point 504, the slope of the load line changes to the ideal constant non-zero slope of 0.25 as initially shown in FIG. 2. The value of iSET for this example is 100 A, therefore for all the values of output current lower than or equal to 100 A, the load line will be flat meaning that the output voltage will be lower than the Vmax 1.01V. The load line modifier circuit 312 can be implemented as part of the pulse computation unit as well. In some other embodiments, it can be external to the regulator 100.

Those skilled in the art may appreciate that the flat line indicated by 502 corresponds to iDC=0, therefore, the droop multiplication will be zero and no DC droop value will be assigned to the output voltage. Similarly, the slanted line (after the point 504) corresponds to iDC=iSUM-iSET, so the droop will be multiplied by the positive difference between the iSUM and iSET.

What it means in a practical implementation is that if the output current is lower than or equal to iSET, then the DC path will have substantially zero droop. The output voltage will be constant at a value determined by the design and will not vary dependent on the output current. At this time, any high frequency variations (noise) in the output current will be compensated for because of the HPF and the output voltage will still be maintained constant irrespective of the high frequency variation (noise).

When the output current is higher than iSET, the excessive current will be used to generate a non-zero droop value and the output voltage will vary inversely depending on the output current as it normally would in a regular AVP implementation.

Figure 6:
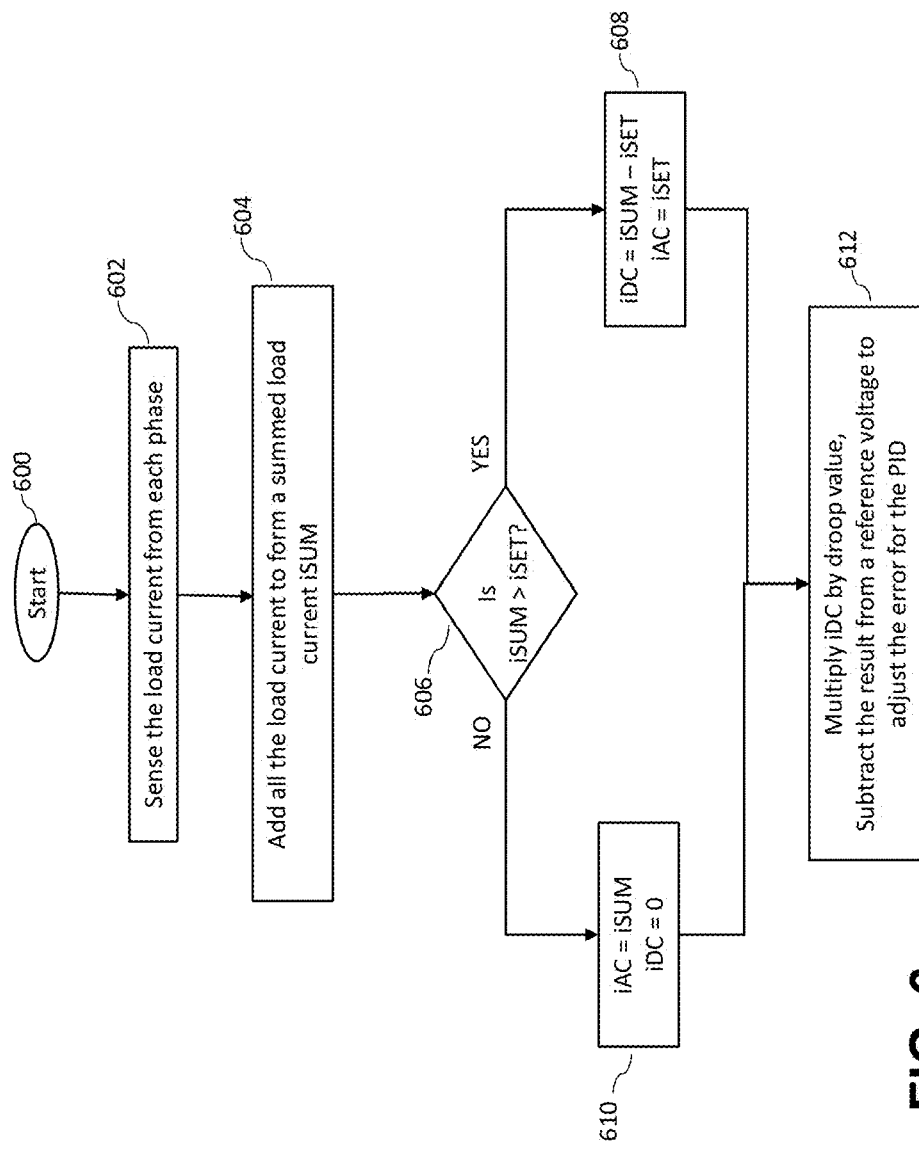
FIG. 6 illustrates an example flow diagram of a multiphase controller implementing a non-linear load line according to an embodiment of the present disclosure.

FIG. 6 illustrates an example flow diagram 600 of implementation of the load line modifier circuit of FIG. 3 and FIG. 4 to be included in controller 300 of FIG. 3, according to an embodiment of the present disclosure.

The flow diagram 600 illustrates an example method for the load line modifier circuit 312 to generate a non-linear load for controller 300 which is configured as a multiphase regulator or to modify the ideal linear load line of the regulator to a non-linear load line. In the example method, after starting at block 600, at block 602 the output currents from various phases can be sensed and at block 604 all the sensed output currents may be added to generate a summed current iSUM. The method then proceed to block 606.

At block 606 the iSUM is compared to a predefined value iSET. If iSUM is greater than iSET, then iSET is subtracted from iSUM and the result is set as the dc current iDC and ac current is set as iSET, at block 608.

If iSUM is lower than or equal to iSET, then iAC is made equal to iSUM and iDC is made equal to zero at block 610. From either of the blocks 608 or 610, the method proceeds to block 612.

At block 612, iDC is multiplied by the calculated droop value and the result is further subtracted from the reference voltage to generate an error voltage for the G-PID block 108 as shown in FIG. 4.

In the above specification, the terms "power converter" and "power supply" may be used interchangeably to mean the same thing. The terms "coupled to", "configured to", "operable to" may be used interchangeably to mean the same thing.

In the above specification, the terms "reference voltage control circuit" and "reference voltage modifier circuit" may be used interchangeably to mean the same thing. The terms "coupled to", "configured to", "operable to" may be used interchangeably to mean the same thing.

In the above specification, some common electronic circuits such as flip-flops or other digital circuits may be clocked by on-chip oscillators derived from phase locked loops (plls), crystal oscillators or any other conventional methods of generating a clock. In other embodiments, the clocks could be external as well.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A circuit to implement a non-linear load line for a multi-phase voltage regulator configured to provide a plurality of output voltages and a plurality of output currents to a load,
    wherein the load line represents a plurality of points, each point representing an output voltage corresponding to an output current,
    wherein the load line has a first region with a zero slope for output currents lower than or equal to a predefined value and wherein the output voltage is constant and lower than a maximum specified value during the first region,
    wherein the load line has a second region with a constant non-zero slope for output currents higher than the predefined value, and wherein the output voltage is variable dependent on the output current during the second region,
    wherein to generate the non-linear load line, the circuit is configured to add the plurality of output currents to generate a summed current,
    wherein the circuit is configured to generate the constant output voltage corresponding to the first region by applying a zero droop value to a first portion of the summed current lower than or equal to the predefined value,
    wherein the circuit is further configured to generate a variable output voltage dependent on the output current by applying a non-zero droop value to a second portion of the summed current above the programmed value,
    wherein the first portion and the second portion of the summed current are used to control pulse width modulation signals to provide a regulated output voltage to the load.

2. The circuit according to claim 1, wherein, in the second region of the load line, the output is variable dependent on the output current in an inversely proportional manner by the non-zero droop value.

3. The circuit according to claim 1, wherein circuit is configured to generate the non-zero value of the droop by multiplying the second portion of the current by a droop value based on the droop circuit.

4. The circuit according to claim 1, wherein the droop circuit includes a digital resistance or a resistor.

5. The circuit according to claim 1, wherein the programmed value is 100 A.

6. The circuit according to claim 1, wherein the maximum specified value is 1.01V.

7. A method to generate a non-linear load line for a multi-phase voltage regulator configured to provide a plurality of output voltages and a plurality of output currents to a load and including a droop circuit,
    wherein the load line represents a plurality of points, each point representing an output voltage corresponding to an output current,
    wherein the load line has a first region with a zero slope for output currents lower than or equal to a predefined value and
    wherein the output voltage is constant and lower than a maximum specified value during the first region,
    wherein the load line has a second region with a constant non-zero slope for output currents higher than the predefined value, and wherein the output voltage is variable dependent on the output current during the second region,
    the method comprising:
adding the plurality of output currents to generate a summed current,
    generating the constant output voltage corresponding to the first region by applying a zero droop value to a first portion of the summed current lower than or equal to the predefined value,
    generating a variable output voltage dependent on the output current by applying a non-zero droop value to a second portion of the summed current above the programmed value,
    and controlling pulse width modulation signals by the first portion and the second portion of the summed current to provide a regulated output voltage to the load.

8. The method according to claim 7, wherein, in the second region of the load line, the output is variable dependent on the output current in an inversely proportional manner by the non-zero droop value.

9. The method according to claim 7, further comprising generating the non-zero value of the droop by multiplying the second portion of the current by a droop value based on the droop circuit.

10. The method according to claim 7, wherein the droop circuit includes a digital resistance or a resistor.

11. The method according to claim 7, wherein the programmed value is 100 A.

12. The method according to claim 7, wherein the maximum specified value is 1.01V.

* * * * *